(12) United States Patent
Carey et al.

(10) Patent No.: US 7,551,409 B2
(45) Date of Patent: Jun. 23, 2009

(54) CURRENT-PERPENDICULAR-TO-THE-PLANE (CPP) MAGNETORESISTIVE SENSOR WITH IMPROVED FERROMAGNETIC FREE LAYER STRUCTURE

(75) Inventors: Matthew J. Carey, San Jose, CA (US); Jeffrey R. Childress, San Jose, CA (US); Stefan Maat, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 427 days.

(21) Appl. No.: 11/560,578

(22) Filed: Nov. 16, 2006

(65) Prior Publication Data

US 2008/0117553 A1 May 22, 2008

(51) Int. Cl.
*G11B 5/39* (2006.01)
(52) U.S. Cl. .................................. 360/324.12
(58) Field of Classification Search ............. 360/324.1, 360/324.11, 324.12, 324.2
See application file for complete search history.

(56) References Cited

U.S. PATENT DOCUMENTS

| | | | |
|---|---|---|---|
| 5,465,185 A | 11/1995 | Heim et al. | |
| 6,466,419 B1 | 10/2002 | Mao | |
| 7,483,245 B2 * | 1/2009 | Kamiguchi et al. | 360/324.11 |
| 2001/0028537 A1 * | 10/2001 | Gill | 360/314 |
| 2002/0126428 A1 * | 9/2002 | Gill | 360/324.12 |
| 2002/0191348 A1 * | 12/2002 | Hasegawa et al. | 360/314 |
| 2004/0075953 A1 | 4/2004 | Gill | |
| 2004/0218311 A1 * | 11/2004 | Saito et al. | 360/314 |
| 2004/0246634 A1 * | 12/2004 | Yuasa et al. | 360/324.11 |
| 2005/0083613 A1 | 4/2005 | Yoshikawa et al. | |
| 2005/0094322 A1 | 5/2005 | Fukuzawa et al. | |
| 2006/0262460 A1 * | 11/2006 | Ide et al. | 360/324.12 |

OTHER PUBLICATIONS

Tanaka et al., "Spin-valve heads in the current-perpendicular-to-plane mode for ultrahigh-density recording", IEEE Transactions on Magnetics, 38 (1):84-88 Part 1 Jan. 2002.
Childress et al., "Dual current-perpendicular-to-plane giant magnetoresistive sensors for magnetic recording heads with reduced sensitivity to spin-torque-induced noise", J. Appl. Phys. vol. 99, 08S305, 2006.
Zhu et al., "Spin transfer induced noise in CPP read heads," IEEE Transactions on Magnetics, vol. 40, No. 1, Jan. 2004, pp. 182-188.
Smith et al., "Angular Dependence of Spin Torque Critical Currents for CPP-GMR Read Heads", IEEE Transactions on Magentics, vol. 41, No. 10, Oct. 2005, pp. 2935-2940.

* cited by examiner

*Primary Examiner*—Jefferson Evans
(74) *Attorney, Agent, or Firm*—Thomas R. Berthold

(57) ABSTRACT

A current-perpendicular-to-the-plane (CPP) magnetoresistive (MR) sensor has an improved free layer structure that includes a first ferromagnetic interface layer on the sensor's nonmagnetic spacer layer, a first electrically conductive interlayer on the first interface layer, a central ferromagnetic NiFe alloy free layer on the first interlayer, a second electrically conductive interlayer on the central free layer, and a second ferromagnetic interface layer on the second interlayer. The first ferromagnetic interface layer, central ferromagnetic free layer, and second ferromagnetic interface layer are ferromagnetically coupled together across the electrically conductive interlayers so their magnetization directions remain parallel. The free layer structure may be used in single or dual CPP sensors and in spin-valve or tunneling MR sensors.

21 Claims, 4 Drawing Sheets

CURRENT-PERPENDICULAR-TO-THE-PLANE (CPP) MAGNETORESISTIVE SENSOR WITH IMPROVED FERROMAGNETIC FREE LAYER STRUCTURE

BACKGROUND OF THE INVENTION

Field of the Invention

The invention relates generally to a current-perpendicular-to-the-plane (CPP) magnetoresistive (MR) sensor that operates with the sense current directed perpendicularly to the planes of the layers making up the sensor stack, and more particularly to a CPP sensor with an improved ferromagnetic free layer structure.

Background of the Invention

One type of conventional magnetoresistive (MR) sensor used as the read head in magnetic recording disk drives is a "spin-valve" (SV) sensor. A SV MR sensor has a stack of layers that includes two ferromagnetic layers separated by a nonmagnetic electrically conductive spacer layer, which is typically copper (Cu). One ferromagnetic layer has its magnetization direction fixed, such as by being pinned by exchange coupling with an adjacent antiferromagnetic layer, and the other ferromagnetic layer has its magnetization direction "free" to rotate in the presence of an external magnetic field. With a sense current applied to the sensor, the rotation of the free-layer magnetization relative to the fixed-layer magnetization is detectable as a change in electrical resistance.

In a magnetic recording disk drive SV read sensor or head, the stack of layers are located in the read "gap" between magnetic shields. The magnetization of the fixed or pinned layer is generally perpendicular to the plane of the disk, and the magnetization of the free layer is generally parallel to the plane of the disk in the absence of an external magnetic field. When exposed to an external magnetic field from the recorded data on the disk, the free-layer magnetization will rotate, causing a change in electrical resistance. If the sense current flowing through the SV is directed parallel to the planes of the layers in the sensor stack, the sensor is referred to as a current-in-the-plane (CIP) sensor, while if the sense current is directed perpendicular to the planes of the layers in the sensor stack, it is referred to as current-perpendicular-to-the-plane (CPP) sensor.

CPP-SV read heads are described by A. Tanaka et al., "Spin-valve heads in the current-perpendicular-to-plane mode for ultrahigh-density recording", IEEE TRANSACTIONS ON MAGNETICS, 38 (1): 84-88 Part 1 January 2002. Another type of CPP sensor is a magnetic tunnel junction sensor, also called a tunneling MR or TMR sensor, in which the nonmagnetic spacer layer is a very thin nonmagnetic tunnel barrier layer. In a CPP-TMR sensor the tunneling current perpendicularly through the layers depends on the relative orientation of the magnetizations in the two ferromagnetic layers. While in a CPP-SV read head the spacer layer is formed of an electrically conductive material, such as Cu, in a CPP-TMR read head the spacer layer is formed of an electrically insulating material, such as $TiO_2$, MgO or $Al_2O_3$.

The CPP MR sensors described above are "single" CPP sensors because they have a single spacer layer and a single pinned layer. A "dual" CPP MR sensor has a second spacer layer and a second pinned layer located on the other side of the free layer, i.e., the side opposite the first spacer layer and first pinned layer. Dual CPP MR sensors are well-known in the art and have been proposed to provide an increased magnetoresistance ($\Delta R/R$) over single CPP MR sensors. Single CPP MR sensors are known to be susceptible to current-induced noise and instability. The spin-polarized current flows perpendicularly through the ferromagnetic layers and produces a spin transfer torque on the local magnetization. This can produce continuous gyrations of the magnetization, resulting in substantial magnetic noise if the sense current is above a certain level. It has been demonstrated that dual CPP-SV sensors may reduce the sensitivity of the free layer to spin-torque-induced instability. (J. R. Childress et al., "Dual current-perpendicular-to-plane giant magnetoresistive sensors for magnetic recording heads with reduced sensitivity to spin-torque-induced noise", J. Appl. Phys. Vol. 99, 08S305, 2006).

The free layers in both single and dual CPP sensors often exhibit magnetostriction, which is the property of a ferromagnetic material that causes it to change its shape when subjected to a magnetic field. In magnetic recording sensors, magnetostriction is also to be avoided because a strain produced by residual stresses in the sensor results in an undesireable uniaxial magnetic anisotropy in the sensor that can interfere with its expected magnetic performance. Moreover, to optimize sensor magnetic stability, positive magnetostriction is to be avoided in CPP sensor free layers.

One of the challenges in the design of CPP-MR sensors is to achieve high magnetoresistance while keeping the magnetic moment of the free layer below a target value and the magnetostriction of the free layer near zero or less than zero. What is needed is a CPP MR sensor with an improved free layer structure that achieves these objectives and that has reduced sensitivity to spin-torque-induced instability.

SUMMARY OF THE INVENTION

The invention is a CPP sensor with an improved free layer structure. The free layer structure includes a first ferromagnetic interface layer on the sensor's nonmagnetic spacer layer, a first electrically conductive interlayer on the first interface layer, a central ferromagnetic NiFe alloy free layer on the first interlayer, a second electrically conductive interlayer on the central free layer, and a second ferromagnetic interface layer on the second interlayer. The first ferromagnetic interface layer, central ferromagnetic free layer, and second ferromagnetic interface layer are ferromagnetically coupled together across the electrically conductive interlayers so their magnetization directions remain parallel.

In a dual CPP sensor embodiment, the second nonmagnetic spacer layer is located on and in contact with second ferromagnetic interface layer of the free layer structure. Also, the free layer structure is preferably substantially symmetric about the center of the central free layer, meaning that the thickness and composition of the electrically conductive interlayers are substantially the same and the thickness and composition of the ferromagnetic interface layers are substantially the same. This symmetry is believed advantageous in a dual CPP sensor for optimizing the symmetry of the sensor structure and reducing the sensitivity of the free layer structure to spin-torque-induced instability.

The ferromagnetic interface layers are each formed of a CoFe alloy with a Fe concentration between about 40-60 atomic percent. The CoFe improves magnetoresistance through higher interfacial scattering at the interfaces between the central free layer and the nonmagnetic spacer layers. While a high Fe concentration content can lead to a higher coercivity for the free layer, it has been discovered in this invention that if CoFe (Fe between about 40 and 60 at. %) interface layers with thicknesses less than about 10 Å are used, the coercivity is maintained at an acceptable level.

The NiFe alloy central free layer has a composition that minimizes magnetostriction. However at this composition, in order to prevent the magnetic moment of the free layer structure from exceeding a target value, the central free layer thickness would have to be reduced to a level where the magnetoresistance is unacceptable. The two electrically conductive interlayers in contact with the central free layer reduce the magnetic moment of the central free layer, which allows the central free layer to be made thick enough to provide an acceptable magnetoresistance value.

For a fuller understanding of the nature and advantages of the present invention, reference should be made to the following detailed description taken together with the accompanying figures.

DETAILED DESCRIPTION OF THE INVENTION

Figure 1:
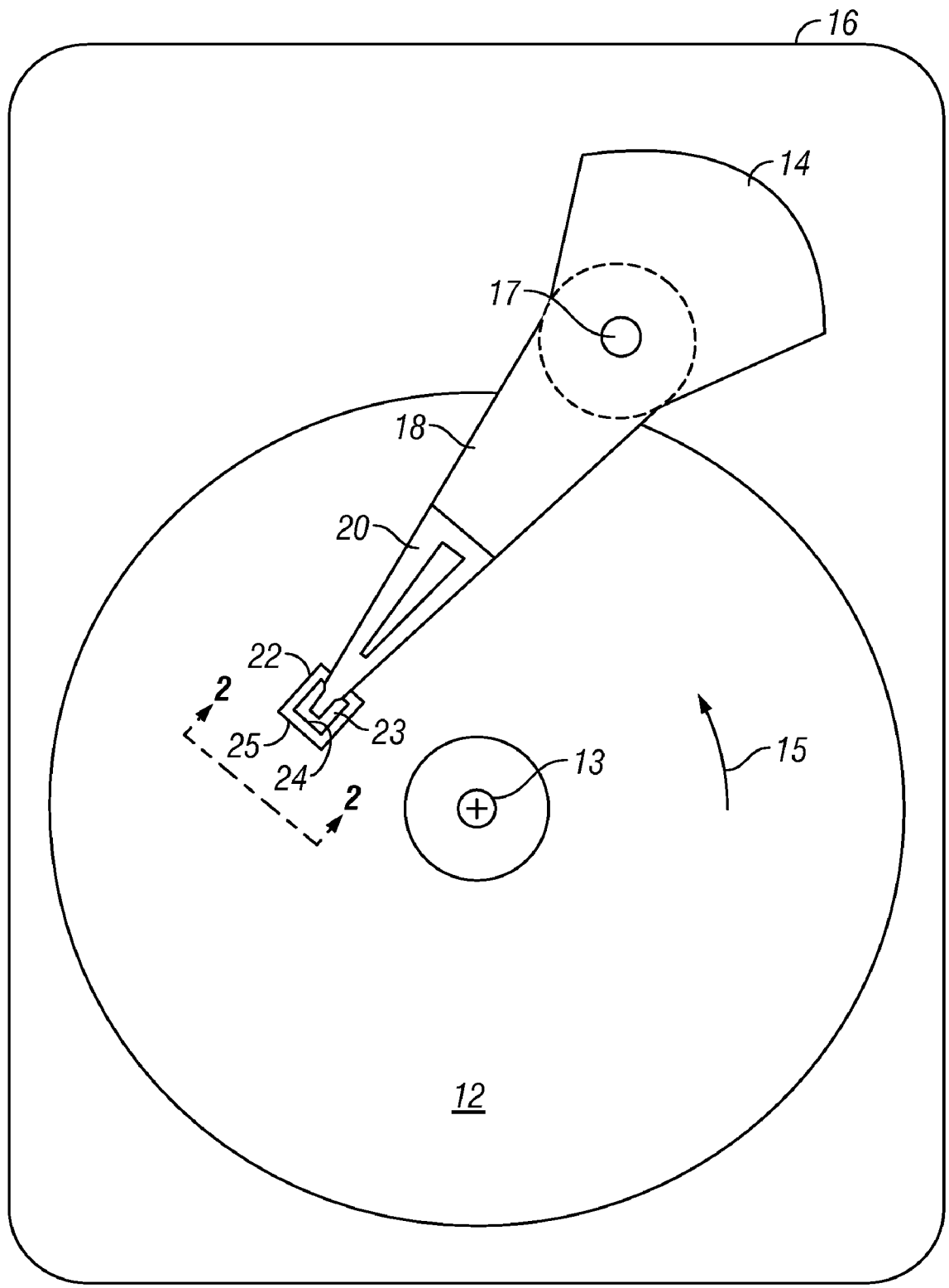
FIG. 1 is a schematic top view of a conventional magnetic recording hard disk drive with the cover removed.

The CPP magnetoresistive (MR) sensor of this invention has application for use in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
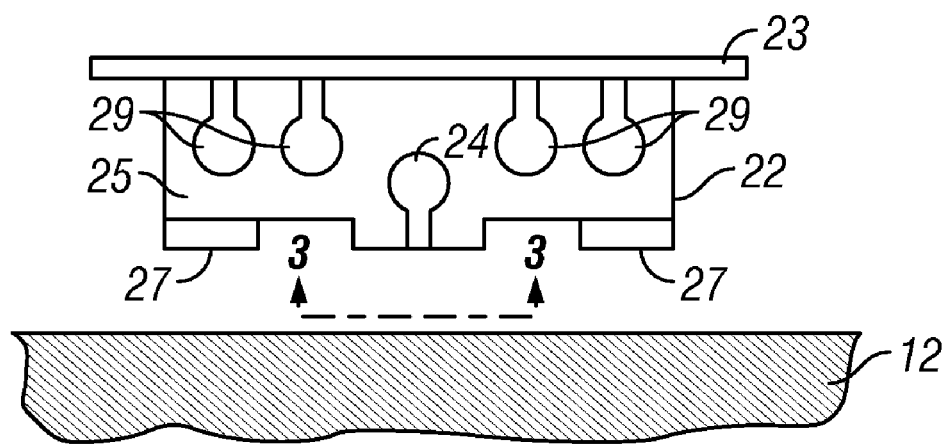
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25.

Figure 3:
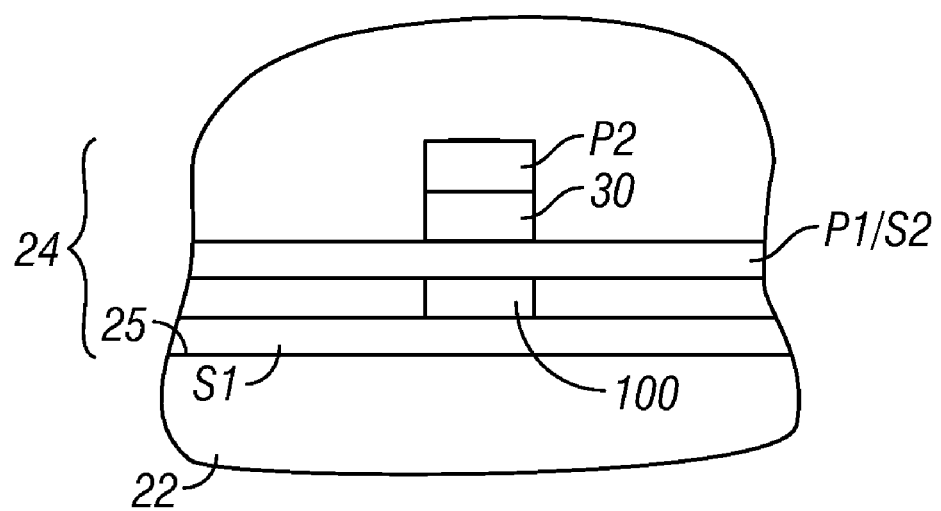
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes magnetic write poles P1/S2 and P1 separated by a write gap 30. The CPP MR sensor or read head 100 is located between two magnetic shields S1 and P1/S2, with P1/S2 also serving as the first write pole for the write head. The shields S1, S2 are formed of magnetically permeable material and are electrically conductive so they can function as the electrical leads to the read head 100. Separate electrical leads may also be used, in which case the read head 100 is formed in contact with layers of electrically conducting lead material, such as tantalum, gold, or copper, that are in contact with the shields S1, S2.

Figure 4:
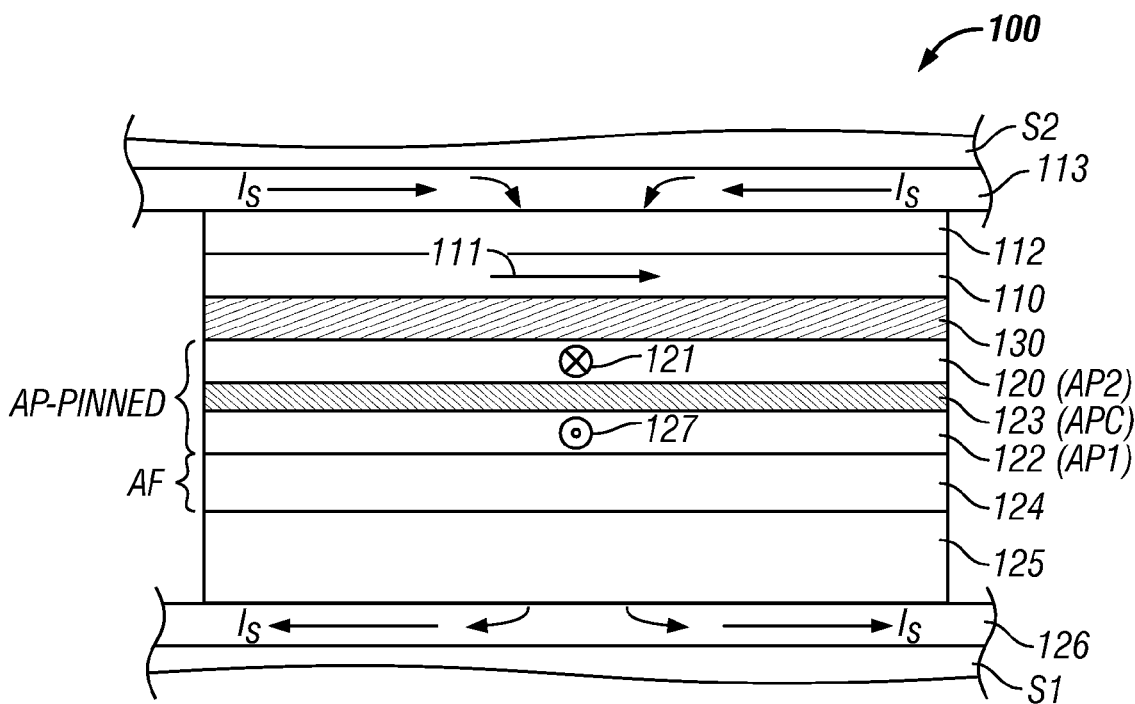
FIG. 4 is a cross-sectional schematic view of a CPP-SV read head showing the stack of layers located between the magnetic shield layers.

FIG. 4 is an enlarged sectional view showing the layers making up sensor 100. Sensor 100 is a conventional CPP-SV read head comprising a stack of layers formed between the two magnetic shield layers S1, S2 that are typically electroplated NiFe alloy films. The lower shield S1 is typically polished by chemical-mechanical polishing (CMP) to provide a smooth substrate for the growth of the sensor stack. This may leave an oxide coating which can be removed with a mild etch just prior to sensor deposition. The sensor layers include a reference ferromagnetic layer 120 having a fixed magnetic moment or magnetization direction 121 oriented transversely (into the page), a free ferromagnetic layer 110 having a magnetic moment or magnetization direction 111 that can rotate in the plane of layer 110 in response to transverse external magnetic fields from the disk 12, and an electrically conducting spacer layer 130, typically copper (Cu), between the reference layer 120 and free layer 110.

The pinned ferromagnetic layer in a CPP MR sensor may be a single pinned layer or an antiparallel (AP) pinned structure like that shown in FIG. 4. An AP-pinned structure has first (AP1) and second (AP2) ferromagnetic layers separated by a nonmagnetic antiparallel coupling (APC) layer with the magnetization directions of the two AP-pinned ferromagnetic layers oriented substantially antiparallel. The AP2 layer, which is in contact with the nonmagnetic APC layer on one side and the sensor's electrically conducting spacer layer on the other side, is typically referred to as the reference layer. The AP1 layer, which is typically in contact with an antiferromagnetic or hard magnet pinning layer on one side and the nonmagnetic APC layer on the other side, is typically referred to as the pinned layer. Instead of being in contact with a hard magnetic layer, AP1 by itself can be comprised of hard magnetic material so that AP1 is in contact with an underlayer on one side and the nonmagnetic APC layer on the other side. The AP-pinned structure minimizes the net magnetostatic coupling between the reference/pinned layers and the CPP-SV free ferromagnetic layer. The AP-pinned structure, also called a "laminated" pinned layer, and sometimes called a synthetic antiferromagnet (SAF), is described in U.S. Pat. No. 5,465,185.

The pinned layer in the CPP-SV sensor in FIG. 4 is an AP-pinned structure with reference ferromagnetic layer 120 (AP2) and a lower ferromagnetic layer 122 (AP1) that are antiferromagnetically coupled across an AP coupling (APC) layer 123. The APC layer 123 is typically Ru, Ir, Rh, Cr or alloys thereof. The AP1 and AP2 layers, as well as the free ferromagnetic layer 110, are typically formed of crystalline CoFe or NiFe alloys, or a multilayer of these materials, such as a CoFe/NiFe bilayer. The free ferromagnetic layer 110, spacer layer 130 and AP2 layer 120 together make up what is call the "active region" of the sensor. The AP1 and AP2 ferromagnetic layers have their respective magnetization directions 127, 121 oriented antiparallel. The AP1 layer 122 may have its magnetization direction pinned by being exchange-coupled to an antiferromagnetic (AF) layer 124 as shown in FIG. 4. Alternatively, the AP-pinned structure may be "self-pinned" or it may be pinned by a hard magnetic layer such as $Co_{100-x}Pt_x$ or $Co_{100-x-y}Pt_xCr_y$ (where x is about between 8 and 30 atomic percent). Instead of being in contact with a hard magnetic layer, AP1 layer 122 by itself can be comprised of hard magnetic material so that it is in contact with an underlayer on one side and the nonmagnetic APC layer 123 on the other side. In a "self pinned" sensor the AP1 and AP2 layer magnetization directions 127, 121 are typically set generally perpendicular to the disk surface by magnetostriction and the residual stress that exists within the fabricated sensor. It is desirable that the AP1 and AP2 layers have similar moments. This assures that the net magnetic moment of the AP-pinned structure is small so that magnetostatic coupling to the free layer 110 is minimized and the effective pinning field of the AF layer 124, which is approximately inversely proportional to the net magnetization of the AP-pinned structure, remains high. In the case of a hard magnet pinning layer, the hard magnet pinning layer moment needs to be accounted for when balancing the moments of AP1 and AP2 to minimize magnetostatic coupling to the free layer.

Located between the lower shield layer S1 and the AP-pinned structure are the bottom electrical lead 126 and a seed layer 125. The seed layer 125 may be a single layer or multiple layers of different materials. Located between the free ferromagnetic layer 110 and the upper shield layer S2 are a capping layer 112 and the top electrical lead 113. The capping layer 112 may be a single layer or multiple layers of different materials, such as a Cu/Ru/Ta trilayer.

In the presence of an external magnetic field in the range of interest, i.e., magnetic fields from recorded data on the disk 12, the magnetization direction 111 of free layer 110 will rotate while the magnetization direction 121 of reference layer 120 will remain fixed and not rotate. Thus when a sense current $I_S$ is applied from top lead 113 perpendicularly through the stack to bottom lead 126, the magnetic fields from the recorded data on the disk will cause rotation of the free-layer magnetization 111 relative to the reference-layer magnetization 121, which is detectable as a change in electrical resistance.

The leads 126, 113 are typically Ta or Rh. However, a lower resistance material may also be used. They are optional and used to adjust the shield-to-shield spacing. If the leads 126 and 113 are not present, the bottom and top shields S1 and S2 are used as leads. The seed layer 125 is typically one or more layers of NiFeCr, NiFe, Ta, Cu or Ru. The AF layer 124 is typically a Mn alloy, e.g., PtMn, NiMn, FeMn, IrMn, PdMn, PtPdMn or RhMn. If a hard magnetic layer is used instead of an AF layer it is typically a CoPt or FePt alloy, for example CoPtCr. The capping layer 112 provides corrosion protection and is typically formed of Ru or Ta.

Figure 5:
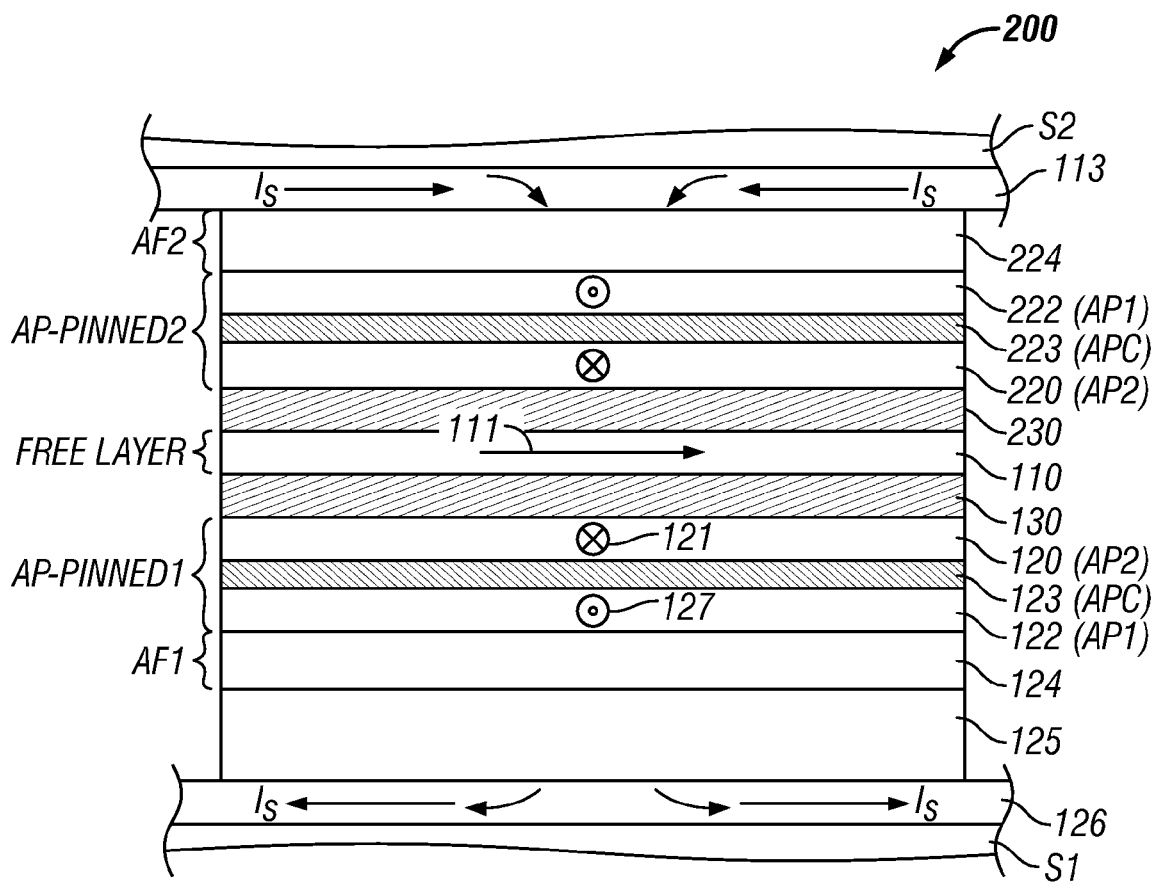
FIG. 5 is a cross-sectional schematic view a dual CPP-SV read head showing the stack of layers located between the magnetic shield layers.

FIG. 5 is a sectional view showing the layers making up a dual CPP-SV sensor 200 based on the "single" CPP-SV sensor of FIG. 4. Dual CPP-SV sensors are well-known in the art and have been proposed to provide an increased magnetoresistance (ΔR/R) over single CPP-SV sensors. Also, single CPP-SV sensors are known to be susceptible to current-induced noise and instability. The spin-polarized current flows perpendicularly through the ferromagnetic layers and produces a spin transfer torque on the local magnetization. This can produce continuous gyrations of the magnetization, resulting in substantial magnetic noise if the sense current is above a certain level. It has been demonstrated that dual CPP-SV sensors may reduce the sensitivity of the free layer to spin-torque-induced instability.

In the dual CPP-SV sensor of FIG. 5, the AF layer 124 is a first AF layer (AF1), the AP-pinned structure comprising layers 122, 123, 120 is a first AP-pinned structure (AP-pinned 1), and the spacer layer 130 is a first spacer layer. A second spacer layer 230, like first spacer layer 130, is located on free layer 110. A second AP-pinned structure (AP-pinned 2), like AP-pinned 1, is located on second spacer layer 230. The AP2 reference layer 220 of AP-pinned 2 is in contact with second spacer layer 230. The AP1 layer 222 of AP-pinned 2 may have its magnetization direction pinned by being exchange-coupled to a second antiferromagnetic layer (AF2) 224. Alternatively, AP-pinned 2 may be "self-pinned" or AP1 of AP-pinned 2 may be pinned by a hard magnetic layer. Instead of being in contact with a hard magnetic layer, AP1 of AP-pinned 2 by itself can be comprised of hard magnetic material.

The CPP MR sensors described above and illustrated in FIGS. 4-5 are CPP-SV sensors. However, the improved free layer structure of this invention is applicable not only to single and dual CPP-SV sensors but also to single and dual CPP tunneling MR (CPP-TMR) sensors. In a CPP-TMR sensor the spacer layers 130, 230 would be formed of an electrically insulating material, such as $TiO_2$, MgO or $Al_2O_3$.

Figure 6:
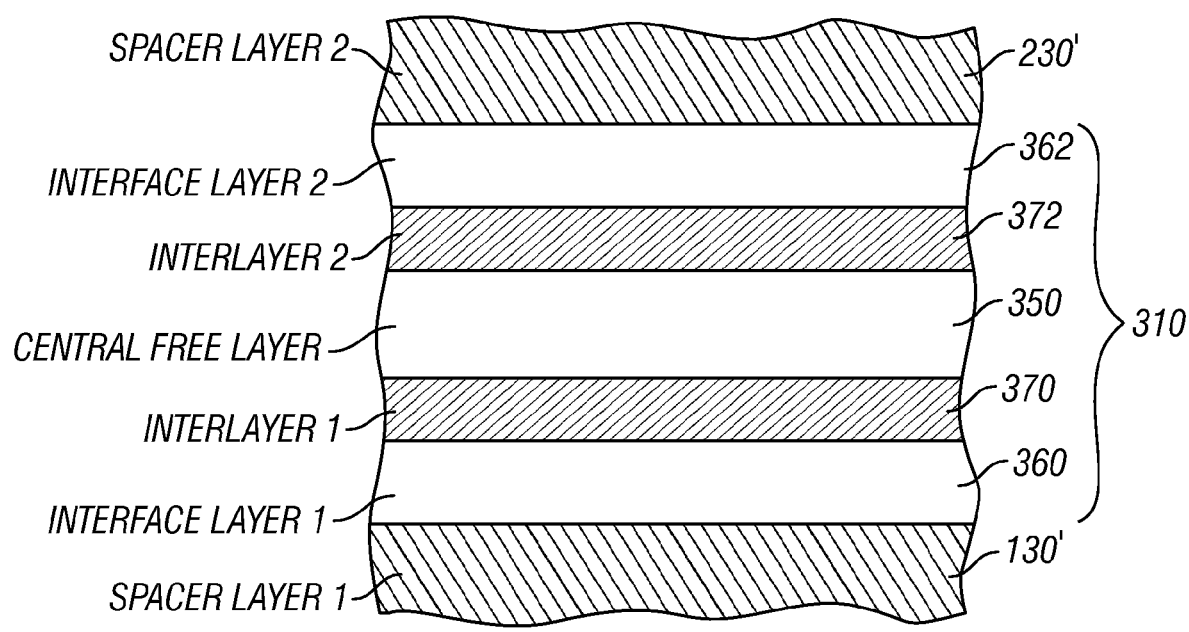
FIG. 6 is a cross-sectional schematic view of the free layer structure of this invention.

This invention is a single or dual CPP-SV or CPP-TMR sensor like that described above but wherein the free ferromagnetic layer 110 is replaced with the improved free layer structure 310, as shown in the schematic cross-sectional view of FIG. 6.

The free layer structure 310 comprises a first ferromagnetic interface layer 360 located on and in contact with the first spacer layer 130', a first electrically conductive interlayer 370 on and in contact with interface layer 360, a central ferromagnetic NiFe alloy free layer 350 on and in contact with interlayer 370, a second electrically conductive interlayer 372 on and in contact with central free layer 350, and a second ferromagnetic interface layer 362 on and in contact with interlayer 372. If the free layer structure 310 is used in a dual CPP MR sensor the second spacer layer 230' is located on and in contact with second interface layer 362. The first ferromagnetic interface layer 360, central ferromagnetic free layer 350, and second ferromagnetic interface layer 362 are ferromagnetically coupled together so their magnetization directions remain parallel.

The free layer structure 310 is preferably substantially symmetric about the center of central free layer 350, meaning that the thickness and composition of interlayers 370, 372 are substantially the same and the thickness and composition of interface layers 360, 362 are substantially the same. This symmetry is believed advantageous in a dual CPP sensor for optimizing the symmetry of the sensor structure and reducing the sensitivity of the free layer structure to spin-torque-induced instability.

The magnetic interface layers 360, 362 are each formed of a CoFe alloy with a thickness between about 2-10 Å. The Fe concentration in atomic percent (at. %) is preferably between about 40-60 at. %, and preferably close to 50 at. %. The CoFe improves magnetoresistance through higher interfacial scattering at the interfaces between the central free layer 350 and the nonmagnetic spacer layers 130', 230'. This is accomplished in two ways. First, because the nonmagnetic spacer layers (typically Cu, Au, or Ag) would readily alloy with the NiFe in the central free layer 350 if they were in contact with it, the interface layers 360, 362 locate the spacer layer material away from the central free layer NiFe material. Second, CoFe has higher interfacial scattering with materials such as Cu than does NiFe.

The typical Fe concentration in CoFe alloy interface layers in conventional CIP-SV sensors is approximately 10 at. %. This is required for low coercivity and high interfacial scattering. However, in this invention it has been found that CoFe alloys with Fe concentration near about 50 at. % have an advantage in CPP sensors for providing higher magnetoresistance. This is because CPP sensors are more dependent on bulk scattering than CIP sensors. While a high Fe concentration content can lead to a higher coercivity, it has been discovered in this invention that if CoFe (Fe between about 40 and 60 at. %) interface layers with thicknesses less than about 10 Å are used, the coercivity is maintained at an acceptable level.

Additions of certain third elements to CoFe such as Al or Si increase the resistivity significantly over CoFe while maintaining a high degree of bulk spin-polarized scattering. This leads to enhanced magnetoresistance for CPP-SV sensors. The preferred alloys are $(Co_xFe_{100-x})_{100-y} M_y$, where M is Al or Si, with x between about 40 and 60 at. % and y between about 20 and 30 at. %. For example, the resistivity of $(CoFe)_{75} Al_{25}$ is 130 μΩ-cm, about an order of magnitude higher than the resistivity of CoFe, while a high degree of bulk spin-polarized scattering is maintained.

The interlayers 370, 372 are each formed of an electrically conductive material, e.g., Cu, Au or Ag, with a thickness between about 1-5 Å, which is thin enough to couple the first and second magnetic interface layers 360, 362, respectively, to the central ferromagnetic layer 350. The interlayers increase the physical thickness of the free layer structure 310 and reduce the coercivity of the central free layer 350. The interlayers improve magnetoresistance by increasing the number of magnetic/nonmagnetic interfaces. Because materials like Cu are known to alloy with the NiFe in the free layer, which would smear the interface, they would not normally be considered for use as the interlayers 370, 372. However, in this invention it has been found that electrically conductive interlayers, like Cu, do not adversely affect magnetoresistance. This unexpected result is believed to be due to the fact that there are still excellent magnetic/nonmagnetic interfaces with the CoFe interface layers 360, 362, and that the amount of Cu at the interfaces with the NiFe central free layer 350 is minimal.

The central ferromagnetic free layer 350 is a NiFe alloy with a thickness preferably between about 5-50 Å. The Fe concentration is preferably between about 2-25 at. %, and preferably between about 10-20 at. %. NiFe is known as a good, relatively low coercivity material for free layers in SV and TMR sensors. NiFe also has a high bulk scattering effect, making it a useful material in CPP sensors. The composition of the NiFe must be carefully chosen to minimize magnetostriction. Positive magnetostriction is to be avoided. In very thick films, a Fe concentration of near 20 at. % results in near-zero magnetostriction. However, interfacial effects change the magnetostriction in very thin films (less than about 100 Å). In this invention a NiFe alloy with Fe concentration of about 14 at. % was used to compensate for the increased magnetostriction in the thin layer used for the central free layer 350. In addition, it has been found that the Cu interlayers 370, 372 reduced the magnetostriction to slightly negative.

In the design of CPP sensors, there is a target value for the magnetic moment of the free layer structure which should not be exceeded if the target recording density of the medium is to be achieved. This target moment is often measured in an equivalent thickness of a single $Ni_{80}Fe_{20}$ free layer, typically about 65 Å or less. For example, if the target moment of the free layer structure 310 is to be substantially equivalent to the moment of a 45 Å $Ni_{80}Fe_{20}$ film, then the moment of the central free layer 350, which is required to be a composition around $Ni_{86}Fe_{14}$ to minimize magnetostriction, may have to be adjusted. In this example, if the interface layers 360 and 362 are each 7 Å of $Co_{50}Fe_{50}$ and if there were no interlayers 370, 372, the $Ni_{86}Fe_{14}$ central free layer thickness would have to be less than about 18 Å to prevent the total moment of the free layer structure from exceeding the equivalent of 45 Å $Ni_{80}Fe_{20}$. However, magnetoresistance decreases with a decrease in the physical thickness of the free layer structure. This is because a thicker free layer structure utilizes more of the full spin-diffusion length of the electrons and thus allows for more bulk spin-dependent scattering of electrons, which increases the magnetoresistance of the sensor. Thus in this invention the two interlayers 370, 372 in contact with the central free layer 350 reduce the moment of the central free layer. In this example two 4 Å thick Cu interlayers 370, 372 enabled the thickness of the $Ni_{86}Fe_{14}$ central free layer to be increased to about 25 Å.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetoresistive sensor capable of sensing external magnetic fields when a sense current is applied perpendicular to the planes of the layers in the sensor, the sensor comprising:
    a substrate;
    a pinned ferromagnetic layer having an in-plane magnetization direction;
    a nonmagnetic spacer layer on and in contact with the pinned layer; and
    a free layer structure on the nonmagnetic spacer layer and comprising a first ferromagnetic interface layer on and in contact with the nonmagnetic spacer layer, a first electrically conductive interlayer on and in contact with the first interface layer, a central ferromagnetic free layer on and in contact with the first interlayer, a second electrically conductive interlayer on and in contact with the central free layer, and a second ferromagnetic interface layer on and in contact with the second interlayer; the first ferromagnetic interface layer, central ferromagnetic free layer, and second ferromagnetic interface layer being ferromagnetically coupled and having in-plane magnetization directions substantially free to rotate in the presence of an external magnetic field; and each of the first and second ferromagnetic interface layers comprising a $(Co_xFe_{100-x})_{100-y} M_y$ alloy, where M is Al or Si, x is between about 40 and 60 atomic percent and y is between about 20 and 30 atomic percent.

2. The sensor of claim 1 wherein each of the first and second interlayers comprises an element selected from Cu, Au and Ag.

3. The sensor of claim 2 wherein each of the first and second interlayers consists essentially of Cu.

4. The sensor of claim 2 wherein each of the first and second interlayers has a thickness in the range of about 1 to 5 Angstroms.

5. The sensor of claim 1 wherein the central ferromagnetic free layer comprises an alloy comprising Ni and Fe wherein Fe is present in said alloy in an amount greater than about 2 atomic percent and less than about 25 atomic percent.

6. The sensor of claim 5 wherein the magnetic moment of the free layer structure is less than the magnetic moment of a 65 Angstrom thick film of $Ni_{80}Fe_{20}$.

7. The sensor of claim 6 wherein the magnetic moment of the free layer structure is substantially equivalent to the magnetic moment of a 45 Angstrom thick film of $Ni_{80}Fe_{20}$ and the thickness of the central ferromagnetic free layer is greater than about 20 Angstroms.

8. The sensor of claim 1 wherein the free layer structure has a magnetostriction of zero or less than zero.

9. The sensor of claim 1 wherein the sensor is a spin-valve sensor and the nonmagnetic spacer layer is electrically conductive.

10. The sensor of claim 1 wherein the sensor is a tunneling sensor and the nonmagnetic spacer layer is electrically insulating.

11. The sensor of claim 1 wherein the sensor is a dual sensor, wherein the pinned layer is a first pinned layer, the nonmagnetic spacer layer is a first nonmagnetic spacer layer, and further comprising a second nonmagnetic spacer layer on and in contact with the second interface layer and a second pinned layer on and in contact with the second nonmagnetic spacer layer.

12. The sensor of claim 1 further comprising:
an antiparallel (AP) pinned structure comprising a first AP-pinned (AP1) ferromagnetic layer having an in-plane magnetization direction, a second AP-pinned (AP2) ferromagnetic layer having an in-plane magnetization direction substantially antiparallel to the magnetization direction of the AP1 layer, and an AP coupling (APC) layer between and in contact with the AP1 and AP2 layers, wherein the AP2 layer comprises said pinned layer.

13. The sensor of claim 1 wherein the sensor is a magnetoresistive read head for reading magnetically recorded data from tracks on a magnetic recording medium, and wherein the substrate is a first shield formed of magnetically permeable material.

14. A current-perpendicular-to-the-plane spin-valve (CPP-SV) magnetoresistive read head for reading magnetically recorded data from tracks on a magnetic recording medium, the head comprising:
a first shield layer of magnetically permeable material;
a pinned ferromagnetic layer on the first shield and having an in-plane magnetization direction;
an electrically conductive nonmagnetic spacer layer on and in contact with the pinned layer;
a free layer structure on the nonmagnetic spacer layer and comprising a first ferromagnetic interface layer on and in contact with the nonmagnetic spacer layer, a first electrically conductive interlayer on and in contact with the first interface layer, a central ferromagnetic free layer on and in contact with the first interlayer and having an in-plane magnetization direction substantially free to rotate in the presence of an external magnetic field and the first interface layer being ferromagnetically coupled to the central free layer, a second electrically conductive interlayer on and in contact with the central free layer, and a second ferromagnetic interface layer on and in contact with the second interlayer and being ferromagnetically coupled to the central free layer; wherein (a) each of the first and second interlayers is selected from the group consisting of Cu, Au and Ag and has a thickness in the range of about 1 to 5 Angstroms, (b) the central ferromagnetic free layer comprises an alloy comprising Ni and Fe wherein Fe is present in said alloy in an greater than about 2 atomic percent and less than about 25 atomic percent, and (c) the magnetic moment of the free layer structure is less than the magnetic moment of a 65 Angstroms thick film of $Ni_{80}Fe_{20}$; and
a second shield of magnetically permeable material, wherein the free layer structure is located between the pinned layer and the second shield.

15. The head of claim 14 wherein the magnetic moment of the free layer structure is substantially equivalent to the magnetic moment of a 45 Angstrom thick film of $Ni_{80}Fe_{20}$ and the thickness of the central ferromagnetic free layer is greater than about 20Angstroms.

16. The head of claim 14 wherein the free layer structure has a magnetostriction of zero or less than zero.

17. The head of claim 14 wherein each of the first and second interlayers consists essentially of Cu.

18. The head of claim 14 wherein each of the first and second ferromagnetic interface layers comprises an alloy comprising Co and Fe wherein Fe is present in said alloy in an amount greater than about 40 atomic percent and less than about 60 atomic percent.

19. The head of claim 14 wherein each of the first and second ferromagnetic interface layers comprises a $(Co_x Fe_{100-x})_{100-y}M_y$ alloy, where M is Al or Si, x is between about 40 and 60 atomic percent and y is between about 20 and 30 atomic percent.

20. The head of claim 14 wherein the CPP-SV head is a dual CPP-SV head, wherein the pinned layer is a first pinned layer, the nonmagnetic spacer layer is a first nonmagnetic spacer layer, and further comprising a second nonmagnetic spacer layer on and in contact with the second interface layer and a second pinned layer on and in contact with the second nonmagnetic spacer layer.

21. The head of claim 20 wherein each of the first and second pinned layers is an antiparallel (AP) pinned structure comprising a first AP-pinned (AP1) ferromagnetic layer having an in-plane magnetization direction, a second AP-pinned (AP2) ferromagnetic layer having an in-plane magnetization direction substantially antiparallel to the magnetization direction of the AP1 layer, and an AP coupling (APC) layer between and in contact with the AP1 and AP2 layers.

* * * * *